US008854766B1

(12) United States Patent
Gustafson et al.

(10) Patent No.: US 8,854,766 B1
(45) Date of Patent: Oct. 7, 2014

(54) DISK DRIVE HAVING A CONFORMAL PERIPHERAL FOIL SEAL HAVING AN OPENING COVERED BY A CENTRAL METAL CAP

(71) Applicant: Western Digital Technologies, Inc., Irvine, CA (US)

(72) Inventors: John R. Gustafson, Los Gatos, CA (US); Mukesh Patel, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/040,368

(22) Filed: Sep. 27, 2013

Related U.S. Application Data

(60) Provisional application No. 61/863,344, filed on Aug. 7, 2013.

(51) Int. Cl.
*G11B 33/08* (2006.01)
*G11B 33/14* (2006.01)
*H05K 7/20* (2006.01)

(52) U.S. Cl.
CPC .................................. *G11B 33/1486* (2013.01)
USPC ..................................... 360/97.12; 360/99.21

(58) Field of Classification Search
CPC .......................... G11B 33/1466; G11B 25/043
USPC ............................................ 360/97.12, 99.21
See application file for complete search history.

(56) References Cited

U.S. PATENT DOCUMENTS

| 5,097,978 | A | 3/1992 | Eckerd |
| 5,270,887 | A | 12/1993 | Edwards et al. |
| 5,276,577 | A | 1/1994 | Brooks et al. |
| 5,454,157 | A | 10/1995 | Ananth et al. |
| 5,600,509 | A | 2/1997 | Kawakami |
| 5,646,801 | A | 7/1997 | Boigenzahn et al. |
| 6,185,807 | B1 | 2/2001 | Kazmierczak et al. |
| 6,266,207 | B1 | 7/2001 | Iwahara et al. |
| 6,347,021 | B2 | 2/2002 | Kazmierczak et al. |
| 6,373,654 | B1 * | 4/2002 | Iwahara et al. ............ 360/97.19 |
| 6,392,838 | B1 | 5/2002 | Hearn et al. |
| 6,525,899 | B2 | 2/2003 | Hearn et al. |
| 6,556,372 | B2 | 4/2003 | Hearn et al. |
| 6,631,049 | B2 | 10/2003 | Satoh et al. |
| 6,721,128 | B1 | 4/2004 | Koizumi et al. |
| 6,822,823 | B1 | 11/2004 | Tsuwako et al. |
| 6,903,898 | B2 | 6/2005 | Nonaka et al. |
| 6,970,322 | B2 | 11/2005 | Bernett |
| 6,989,493 | B2 | 1/2006 | Hipwell, Jr. et al. |
| 7,016,145 | B2 | 3/2006 | Gunderson et al. |
| 7,019,942 | B2 | 3/2006 | Gunderson et al. |

(Continued)

*Primary Examiner* — Joseph Feild
*Assistant Examiner* — Gustavo Polo

(57) ABSTRACT

A novel hermetically sealed disk drive comprises a disk drive enclosure that includes a disk drive base with a bottom face, four side faces, and a top cover. The disk drive also comprises a peripheral foil seal overlapping each of the four side faces and having a first opening therethrough that overlies the upper surface of the top cover. The peripheral foil seal conforms to the disk drive enclosure and is adhered to the top face and to each of the four side faces by a first continuous adhesive layer. The hermetically sealed disk drive also includes a central metal cap completely covering the first opening and being adhered to the upper surface of the top cover through the first opening by a second continuous adhesive layer. The central metal cap is thicker than the continuous metal foil, and the disk drive enclosure is helium-filled.

12 Claims, 3 Drawing Sheets

(56) References Cited

U.S. PATENT DOCUMENTS

| | | |
|---|---|---|
| 7,123,440 B2 | 10/2006 | Albrecht et al. |
| 7,218,473 B2 | 5/2007 | Bernett et al. |
| 7,355,811 B1 | 4/2008 | Gifford et al. |
| 7,362,541 B2 | 4/2008 | Bernett et al. |
| 7,365,937 B2 | 4/2008 | Gunderson |
| 7,420,771 B1 | 9/2008 | Hanke et al. |
| 7,434,987 B1 | 10/2008 | Gustafson et al. |
| 7,518,859 B2 | 4/2009 | Kobayashi |
| 7,522,375 B2 | 4/2009 | Tsuda et al. |
| 7,599,147 B2 | 10/2009 | Gunderson |
| 7,709,078 B1 | 5/2010 | Sevier et al. |
| 7,986,490 B2 | 7/2011 | Hirono et al. |
| 8,194,348 B2 | 6/2012 | Jacoby et al. |
| 8,248,724 B2 | 8/2012 | Hayakawa et al. |
| 8,451,559 B1 * | 5/2013 | Berding et al. ............ 360/99.21 |
| 2001/0044023 A1 | 11/2001 | Johnson et al. |
| 2003/0081348 A1 | 5/2003 | Watanabe et al. |
| 2003/0179489 A1 * | 9/2003 | Bernett et al. ............ 360/97.01 |
| 2005/0068666 A1 | 3/2005 | Albrecht et al. |
| 2005/0184463 A1 | 8/2005 | Boutaghou et al. |
| 2005/0253343 A1 | 11/2005 | Hampton |
| 2006/0002005 A1 | 1/2006 | Miyazaki et al. |
| 2006/0034010 A1 | 2/2006 | Abe et al. |
| 2007/0035872 A1 | 2/2007 | Hayakawa et al. |
| 2007/0183085 A1 | 8/2007 | Hatchett et al. |
| 2007/0263319 A1 | 11/2007 | Calderon et al. |
| 2007/0278909 A1 | 12/2007 | Xu et al. |
| 2008/0007866 A1 | 1/2008 | Hayakawa et al. |
| 2008/0068745 A1 | 3/2008 | Uefune et al. |
| 2008/0088969 A1 | 4/2008 | Uefune et al. |
| 2008/0165448 A1 | 7/2008 | Ichikawa et al. |
| 2008/0165449 A1 | 7/2008 | Shindo et al. |
| 2008/0247082 A1 | 10/2008 | Kavosh et al. |
| 2008/0310048 A1 | 12/2008 | Hirono et al. |
| 2009/0097163 A1 | 4/2009 | Suzuki et al. |
| 2009/0102131 A1 | 4/2009 | Gunderson |
| 2009/0168233 A1 | 7/2009 | Kouno et al. |
| 2009/0241322 A1 | 10/2009 | Uefune et al. |
| 2011/0051287 A1 | 3/2011 | Tokunaga |
| 2011/0211279 A1 | 9/2011 | Jacoby et al. |
| 2011/0212281 A1 | 9/2011 | Jacoby et al. |

* cited by examiner

DISK DRIVE HAVING A CONFORMAL PERIPHERAL FOIL SEAL HAVING AN OPENING COVERED BY A CENTRAL METAL CAP

CROSS-REFERENCE TO RELATED APPLICATION

This application claims priority to provisional U.S. Patent Application Ser. No. 61/863,344, filed on Aug. 7, 2013, which is incorporated herein in its entirety.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a mirror and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities.

Disk drive enclosures disclosed in the art to contain helium are typically hermetically sealed in an attempt to prevent an unacceptable rate of helium leakage. Although some negligible amount of helium leakage is unavoidable, a non-negligible amount of helium leakage is undesirable because it can alter the thickness of the gas lubrication film between the head and the disk, and thereby affect the performance of the head. A non-negligible amount of helium leakage is also undesirable because it can alter the tribochemistry of the head disk interface, possibly leading to degradation in reliability, head crashes, and associated data loss.

Various methods and structures that have been disclosed in the past to hermetically seal disk drive enclosures. Some of these have been too costly, have required too much change to existing disk drive manufacturing processes, and/or were not able to retain helium internal to the disk drive enclosure for sufficient time to ensure adequate product reliability. Others have made rework of disk drives (after assembly) difficult or impractical, or had structural problems (e.g. blistering of flexible seals due to gas pressure within the disk drive enclosure). Thus, there is a need in the art for disk drive enclosure sealing methods and structures that may be practically implemented and integrated in a high volume and low cost disk drive manufacturing process, and/or that can retain helium internal to a disk drive enclosure for a sufficient period of time to ensure adequate post-manufacture product reliability and lifetime, and/or that can practically permit rework of disk drives after assembly.

DETAILED DESCRIPTION OF EXAMPLE EMBODIMENTS

Figure 1:
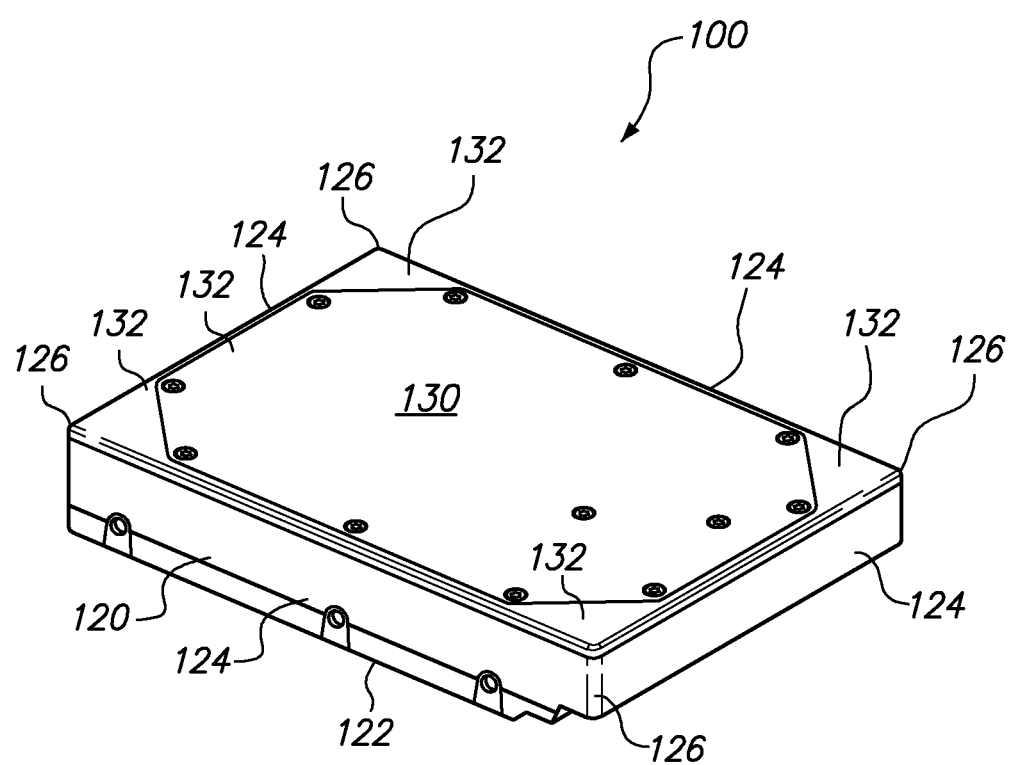
FIG. 1 is a perspective view of a disk drive capable of being sealed by an embodiment of the present invention.

FIG. 1 is a perspective view of a disk drive 100 capable of being sealed by an embodiment of the present invention. The disk drive 100 includes a disk drive enclosure that includes a disk drive base 120, and a top cover 130. The disk drive base 120 includes a bottom face 122 and four side faces 124. The enclosure of disk drive 100 has a top face 132 that includes an upper surface of the top cover 130 and that includes the upper surface of the disk drive base 120 near its four corners 126. Note that in the embodiment of FIG. 1, the top cover 130 is generally octagonal in shape so that it does not overlie the corners 126 of the disk drive 100.

The enclosure of disk drive 100 is helium-filled (i.e. encloses a substantial concentration of helium gas). Practically, the concentration of enclosed helium gas (e.g. versus remaining air) will be less than 100% initially, and is expected to drop over the useful life of the disk drive 100. Still, the disk drive 100 may be considered "helium-filled" throughout its useful life so long as it continues to enclose a substantial concentration of helium gas. Note also that 1.0 atmosphere pressure of helium is not required for the disk drive 100 to be considered "helium-filled." For example, the helium-filled disk drive enclosure preferably initially encloses helium having between 0.3 to 1.0 atmosphere partial pressure, and may also enclose air having between 0 to 0.7 atmosphere partial pressure. In certain applications, it may be desirable for at least 70% of the helium gas that is initially enclosed to remain enclosed after a 10 year useful life of the hermetically sealed disk drive.

Figure 2:
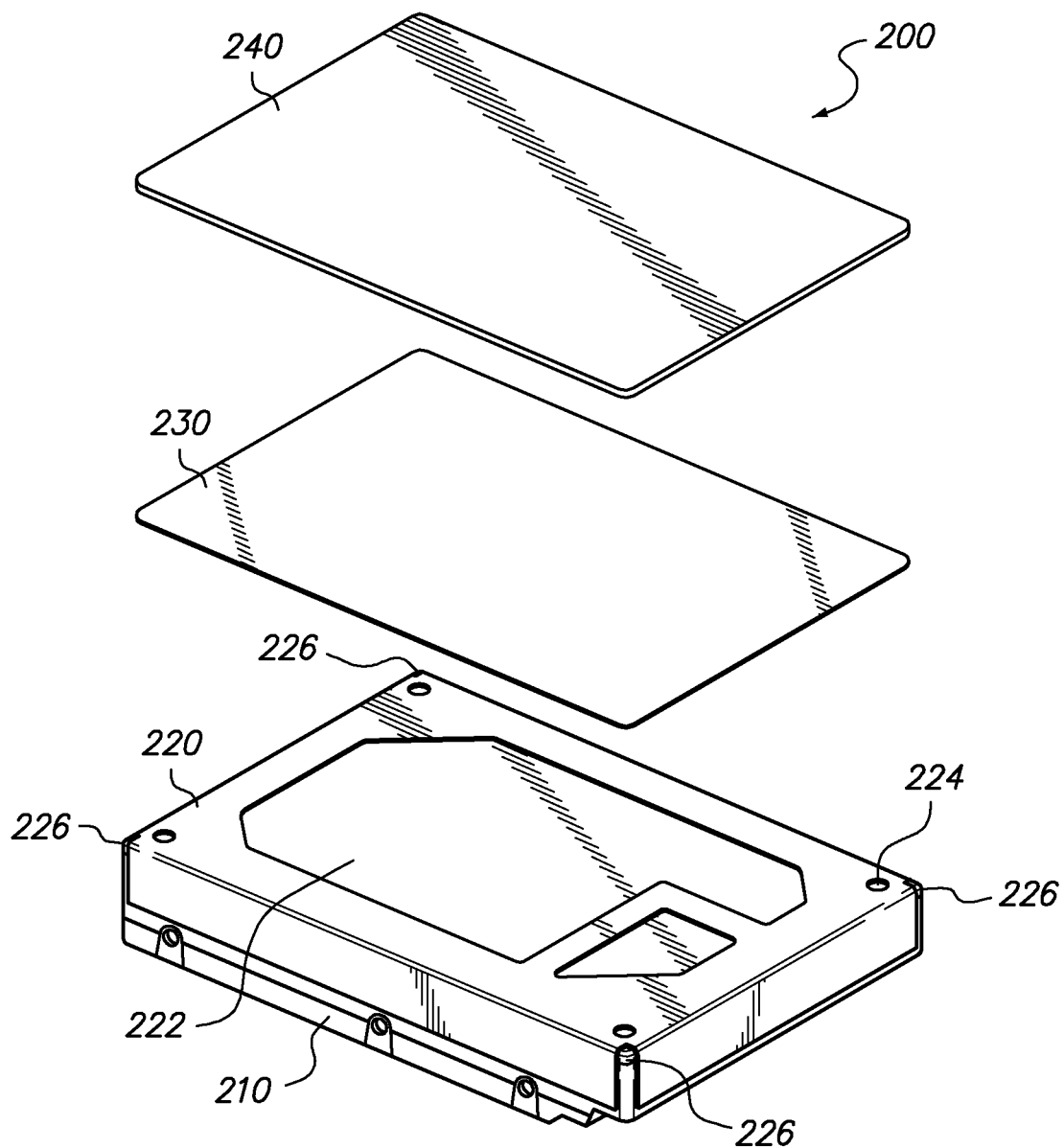
FIG. 2 is a partially-exploded perspective view of a disk drive according to an embodiment of the present invention.

FIG. 2 is a partially-exploded perspective view of a disk drive 200 according to an embodiment of the present invention. The hermetically sealed disk drive 200 includes a peripheral foil seal 220. The peripheral foil seal 220 includes a continuous metal foil, and a first continuous adhesive layer coating the underside of the continuous metal foil. In the present context, a "continuous metal foil" is a metal foil that is one contiguous and monolithic foil sheet, rather than an assembly of previously separate sub-regions. The peripheral foil seal 220 conforms to the disk drive enclosure 210, substantially covers the periphery of the top face of the disk drive enclosure 210, and is adhered to the top face and to each of the four side faces of the disk drive enclosure 210 by the first continuous adhesive layer. In the embodiment of FIG. 2, the peripheral foil seal 220 covers at least any gap around the peripheral edges of a top cover of the disk drive enclosure 210 (e.g. top cover 130 of FIG. 1).

In the embodiment of FIG. 2, the peripheral foil seal 220 also extends closer to the corners 226 of the disk drive enclosure 210 than does the disk drive top cover (e.g. top cover 130 of FIG. 1), so that the peripheral foil seal 220 can overlap the disk drive base (e.g. disk drive base 120 of FIG. 1) at the corners 226 by a corner overlap distance. The corner overlap distance is preferably at least 5 mm to sufficiently reduce the rate of helium diffusion through the first continuous adhesive layer. Such a minimum corner overlap distance described above may serve to help retain helium internal to a disk drive enclosure 210 for a sufficient period of time to ensure adequate post-manufacture product reliability and lifetime.

It is not necessary for a metal foil to have zero openings or holes to qualify as a "continuous metal foil" herein, because so long as any such openings or holes in the continuous metal foil are disposed far enough away (e.g. at least 5 mm away in certain embodiments) from each opening in the top face of the disk drive enclosure 210 that is intended to be sealed by the peripheral foil seal 220, the metal foil will still continuously cover such opening in the disk drive enclosure 210. In the present context the first "continuous adhesive layer" is an adhesive layer that continuously encircles an opening in the disk drive enclosure 210 that is intended to be sealed by the peripheral foil seal 220 (e.g. the seam around the top cover 130) through which helium might otherwise escape.

In the embodiment of FIG. 2, the continuous metal foil of the peripheral foil seal 220 may be a pure metal or metal alloy foil that includes copper, aluminum, tin, lead, and/or gold, preferably having a metal foil thickness in the range 2 to 100 microns. Alternatively, the continuous metal foil may comprise a stainless steel foil having a thickness in the range 2 to 40 microns. Such thickness ranges may advantageously allow the peripheral foil seal 220 to be flexible enough to conform to the geometry of the disk drive enclosure 210 without gaps or wrinkles through which helium might leak, while also having adequate robustness to avoid damage from disk drive handling. Alternatively, but not preferably, in certain embodiments the continuous metal foil may comprise a thin metal coating sputtered upon a plastic film.

In the embodiment of FIG. 2, the first continuous adhesive layer (underlying the peripheral foil seal 220) may comprise an acrylic pressure sensitive adhesive (e.g. having a thickness in the range 10 to 50 microns), which is an adhesive that reasonably permits removal of the peripheral foil seal 220 for disk drive rework that may become necessary during or after disk drive manufacture. Such a first continuous adhesive layer thickness range, along with the aforementioned overlap, may serve to retain helium internal to a disk drive enclosure 210 for a sufficient period of time to ensure adequate post-manufacture product reliability and lifetime.

In the embodiment of FIG. 2, the hermetically sealed disk drive 200 further includes a central metal cap 240 that completely covers a first opening 222 through the center of the peripheral foil seal 220. The central metal cap 240 is adhered to the upper surface of the disk drive enclosure 210 through the first opening 222 by a second continuous adhesive layer 230.

In the embodiment of FIG. 2, the central metal cap 240 can be thicker than the continuous metal foil of the peripheral foil seal 220, because the central metal cap 240 is disposed over the approximately flat top surface of the disk drive enclosure. Hence it does not adhere to the disk drive sides, and so does not need to bend as much as the peripheral foil seal 220, and so can have lesser flexibility than the continuous metal foil of the peripheral foil seal 220. Moreover, in the embodiment of FIG. 2, the central metal cap 240 is preferably thicker than the continuous metal foil of the peripheral foil seal 220, for example so that it can have increased structural rigidity to prevent blistering due to positive gas pressure within the disk drive enclosure 210. For example, the central metal cap 240 may comprise stainless steel having a thickness in the range 0.1 to 1 mm. Alternatively, for example, the central metal cap 240 may comprise aluminum having a thickness in the range 0.2 to 1 mm.

In the embodiment of FIG. 2, the second continuous adhesive layer 230 may optionally comprise an acrylic pressure sensitive adhesive having a thickness in the range 25 to 150 microns. In that case, the periphery of the central metal cap 240 preferably overlaps the peripheral foil seal by at least 5 mm.

However, preferably the central metal cap 240 is not applied until after assembled disk drive testing, so that the only peripheral foil seal 220 (without the central metal cap 240) is relied upon alone to retain helium during the disk drive manufacturing process, and most rework requirements. In such embodiments, only after the disk drive 200 is reasonably likely to not require further rework (e.g. after testing) is the central metal cap 240 applied for added structural robustness and resistance to blistering. Since, at that stage, the likelihood that rework will be necessary is low, the central metal cap 240 can be applied with an adhesive that is not convenient to remove for rework. For example, thermal set epoxy adhesive (and/or thermoplastic adhesive) can be difficult to rework, but offers advantageously higher resistance to helium diffusion than pressure sensitive acrylic adhesive.

Hence, in the embodiment of FIG. 2, the second continuous adhesive layer 230 preferably comprises thermal set epoxy having a thickness in the range 2 to 100 microns, which can be applied in liquid form to fill voids and recesses prior to curing. In that case, considering the higher resistance to helium diffusion of the thermal set epoxy adhesive, the periphery of the central metal cap 240 preferably overlaps the peripheral foil seal by at least 2 mm.

In the embodiment of FIG. 2, the continuous metal foil of the peripheral foil seal 220 optionally includes a second opening 224 therethrough that overlies the upper surface of the disk drive enclosure 210 adjacent a corner. The central metal cap 240 is optionally adhered to the upper surface of the disk drive enclosure 210 through the second opening 224. In the embodiment of FIG. 2, this option is shown for all four corners of the hermetically sealed disk drive 200. In such an embodiment, the second continuous adhesive layer 230 preferably comprises thermal set epoxy, which can be applied in liquid form to fill voids and recesses prior to curing and has higher resistance to helium diffusion, because the second opening 224 is disposed close to the corner of the disk drive enclosure 210, and therefore close to an edge of the peripheral foil seal 220 (where non-negligible leakage of helium may otherwise be likely).

Figure 3:
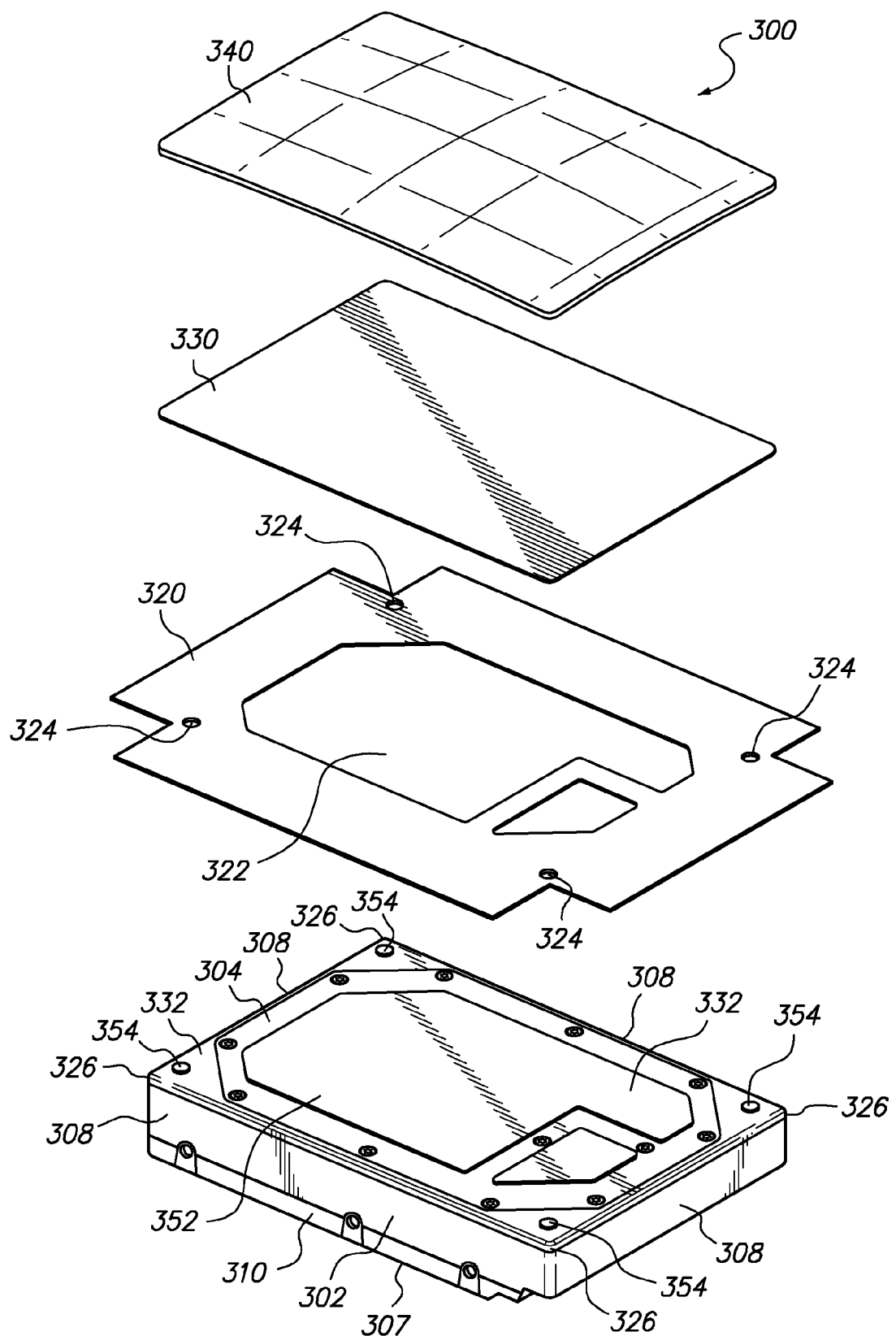
FIG. 3 is a partially-exploded perspective view of a disk drive according to another embodiment of the present invention.

FIG. 3 is a partially-exploded perspective view of a disk drive 300 according to another embodiment of the present invention. The disk drive 300 includes a disk drive enclosure 310 that includes a disk drive base 302, and a top cover 304. The disk drive base 302 includes a bottom face 307 and four side faces 308. The disk drive enclosure 310 has a top face 332 that includes an upper surface of the top cover 304 and that includes the upper surface of the disk drive base 302 near its four corners 326. Note that in the embodiment of FIG. 3, the top cover 304 is generally octagonal in shape so that it does not overlie the corners 326 of the disk drive enclosure 310. The disk drive enclosure 310 is helium-filled (i.e. encloses a substantial concentration of helium gas).

The disk drive 300 includes a peripheral foil seal 320. The peripheral foil seal 320 includes a continuous metal foil, and a first continuous adhesive layer coating the underside of the continuous metal foil. After adhesion to the disk drive enclosure 310 upon assembly, the peripheral foil seal 320 conforms to the disk drive enclosure 310, substantially covers the periphery of the top face 332 of the disk drive enclosure 310, and is adhered to the top face 332 and to each of the four side faces 308 of the disk drive enclosure 310 by the first continuous adhesive layer. In the embodiment of FIG. 3, the peripheral foil seal 320 covers at least any gap around the peripheral edges of the top cover 304.

In the embodiment of FIG. 3, the peripheral foil seal 320 also extends closer to the corners 326 of the disk drive enclosure 310 than does the disk drive top cover 304, so that the peripheral foil seal 320 can overlap the disk drive base 302 at the corners 326 by a corner overlap distance. For example, the peripheral foil seal 320 preferably extends at least 5 mm closer to each corner 326 than does the top cover 304, and the peripheral foil seal 320 is preferably adhered to the top surface 332 of the disk drive base 302 of the disk drive enclosure 310 adjacent each corner 326. In certain embodiments, such extension may sufficiently reduce the rate of helium diffusion through the first continuous adhesive layer to help retain helium internal to a disk drive enclosure 310 for a sufficient period of time to ensure adequate post-manufacture product reliability and lifetime.

In the embodiment of FIG. 3, the continuous metal foil of the peripheral foil seal 320 may be a pure metal or metal alloy foil that includes copper, aluminum, tin, lead, and/or gold, preferably having a metal foil thickness in the range 2 to 100 microns. Alternatively, the continuous metal foil may comprise a stainless steel foil having a thickness in the range 2 to 40 microns. Such thickness ranges may advantageously allow the peripheral foil seal 320 to be flexible enough to conform to the geometry of the disk drive enclosure 310 without gaps or wrinkles through which helium might leak, while also having adequate robustness to avoid damage from disk drive handling.

In the embodiment of FIG. 3, the first continuous adhesive layer (underlying the peripheral foil seal 320) may comprise an acrylic pressure sensitive adhesive (e.g. having a thickness in the range 10 to 50 microns), which is an adhesive that reasonably permits removal of the peripheral foil seal 320 for disk drive rework that may become necessary during or after disk drive manufacture. Such a first continuous adhesive layer thickness range, along with the aforementioned extension/overlap, may serve to retain helium internal to a disk drive enclosure 310 for a sufficient period of time to ensure adequate post-manufacture product reliability and lifetime.

In the embodiment of FIG. 3, the hermetically sealed disk drive 300 further includes a central metal cap 340 that completely covers a first opening 322 through the center of the peripheral foil seal 320. The central metal cap 340 is adhered to the upper surface 332 of the disk drive enclosure 310 through the first opening 322 by a second continuous adhesive layer 330.

In the embodiment of FIG. 3, the central metal cap 340 can be thicker than the continuous metal foil of the peripheral foil seal 320, because the central metal cap 340 does not adhere to the disk drive sides 308, and so does not have to bend as much as the peripheral foil seal 320, and so can have lesser flexibility than the continuous metal foil of the peripheral foil seal 320. Moreover, in the embodiment of FIG. 3, the central metal cap 340 is preferably thicker than the continuous metal foil of the peripheral foil seal 320, for example so that it can have increased structural rigidity to prevent blistering due to positive gas pressure within the disk drive enclosure 310. For example, the central metal cap 340 may comprise stainless steel having a thickness in the range 0.1 to 1 mm. Alternatively, for example, the central metal cap 340 may comprise aluminum having a thickness in the range 0.2 to 1 mm.

In the embodiment of FIG. 3, the second continuous adhesive layer 330 may optionally comprise an acrylic pressure sensitive adhesive having a thickness in the range 25 to 150 microns. In that case, the periphery of the central metal cap 340 preferably overlaps the peripheral foil seal by at least 5 mm.

However, preferably the central metal cap 340 is not applied until after assembled disk drive testing, so that the peripheral foil seal 320 (without the central metal cap 340) is relied upon alone to retain helium during the disk drive manufacturing process, and most rework requirements. In such embodiments, only after the disk drive 300 is reasonably likely to not require further rework (e.g. after testing) is the central metal cap 340 applied for added structural robustness and resistance to blistering. Since, at that stage, the likelihood that rework will be necessary is low, the central metal cap 340 can be applied with an adhesive that is not convenient to remove for rework. For example, thermal set epoxy adhesive can be difficult to rework, but offers advantageously higher resistance to helium diffusion than pressure sensitive acrylic adhesive.

Hence, in the embodiment of FIG. 3, the second continuous adhesive layer 330 preferably comprises thermal set epoxy having a thickness in the range 2 to 100 microns, which can be applied in liquid form to fill voids and recesses prior to curing. In that case, considering the higher resistance to helium diffusion of the thermal set epoxy adhesive, the periphery of the central metal cap 340 preferably overlaps the peripheral foil seal by at least 2 mm.

In the embodiment of FIG. 3, the central metal cap 340 is optionally slightly convex as viewed from above in its free state (if unconstrained, e.g. prior to assembly). In certain embodiments, such convexity may advantageously cause the periphery of the central metal cap 340 to be preloaded against the peripheral foil seal 320, with the center of the central metal cap 340 being adhered to the upper surface 332 of the disk drive enclosure 310 through the first opening 322 in the peripheral foil seal 320. Such preload may advantageously reduce the likelihood of helium leakage around the periphery of the central metal cap 340.

In the embodiment of FIG. 3, the continuous metal foil of the peripheral foil seal 320 optionally includes a plurality of second openings 324 therethrough that overlie the upper surface 332 of the disk drive enclosure 310 adjacent the corners 326. The central metal cap 340 is optionally adhered to the upper surface of the disk drive enclosure 310 through the second openings 324. In such an embodiment, the second continuous adhesive layer 330 preferably comprises thermal set epoxy, which can be applied in liquid form to fill voids and recesses prior to curing and has higher resistance to helium diffusion, because the second openings 324 are disposed close to the corners 326 of the disk drive enclosure 310, and therefore close to the edges of the peripheral foil seal 320 (where non-negligible leakage of helium may otherwise be likely).

In the embodiment of FIG. 3, the upper surface 332 of the disk drive enclosure 310 optionally has a first slightly raised plateau 352 that protrudes into the first opening 322 through the peripheral foil seal 320. The upper surface 332 of the disk drive enclosure 310 may also have a plurality of second slightly raised plateaus 354 that protrude into the second openings 324 through the peripheral foil seal 320. Such plateaus 352, 354 may advantageously reduce the thickness of adhesive required to adhere the central metal cap 340 to the disk drive enclosure 310 via the first and second openings 322, 324, respectively. Alternatively or in addition, such plateaus 352, 354 may reduce any need for the central metal cap 340 to locally flex towards the disk drive enclosure 310 at the locations of the first and second openings 322, 324, thereby enhancing the flatness and integrity of the hermetic seal.

In the foregoing provisional specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms. "Preferably" is used herein to mean preferably but not necessarily.

We claim:

1. A hermetically sealed disk drive comprising:
    a disk drive enclosure including
        a disk drive base with a bottom face and four side faces, and
        a top cover, wherein the disk drive enclosure has a top face that includes an upper surface of the top cover and an upper surface of the disk drive base;
    a peripheral foil seal including
        a continuous metal foil overlapping each of the four side faces and having a first opening therethrough that overlies the upper surface of the to cover, and
        a first continuous adhesive layer coating the continuous metal foil,
        the peripheral foil seal conforming to the disk drive enclosure and being adhered to the top face and to each of the four side faces by the first continuous adhesive layer; and
    a central metal cap completely covering the first opening and being adhered to the upper surface of the top cover through the first opening by a second continuous adhesive layer, the central metal cap being thicker than the continuous metal foil;
    wherein the disk drive enclosure is helium-filled; and
    wherein the central metal cap comprises stainless steel having a thickness in the range 0.1 to 1 mm.

2. A hermetically sealed disk drive comprising:
    a disk drive enclosure including
        a disk drive base with a bottom face and four side faces, and
        a top cover, wherein the disk drive enclosure has a top face that includes an upper surface of the top cover and an upper surface of the disk drive base;
    a peripheral foil seal including
        a continuous metal foil overlapping each of the four side faces and having a first opening therethrough that overlies the upper surface of the to cover, and
        a first continuous adhesive layer coating the continuous metal foil,
        the peripheral foil seal conforming to the disk drive enclosure and being adhered to the top face and to each of the four side faces by the first continuous adhesive layer; and
    a central metal cap completely covering the first opening and being adhered to the upper surface of the top cover through the first opening by a second continuous adhesive layer, the central metal cap being thicker than the continuous metal foil;
    wherein the disk drive enclosure is helium-filled; and
    wherein the central metal cap comprises aluminum having a thickness in the range 0.2 to 1 mm.

3. The hermetically sealed disk drive of claim 2 wherein the second continuous adhesive layer comprises acrylic pressure sensitive adhesive having a thickness in the range 25 to 150 microns.

4. A hermetically sealed disk drive comprising:
    a disk drive enclosure including
        a disk drive base with a bottom face and four side faces, and
        a top cover, wherein the disk drive enclosure has a top face that includes an upper surface of the top cover and an upper surface of the disk drive base;
    a peripheral foil seal including
        a continuous metal foil overlapping each of the four side faces and having a first opening therethrough that overlies the upper surface of the to cover, and
        a first continuous adhesive layer coating the continuous metal foil,
        the peripheral foil seal conforming to the disk drive enclosure and being adhered to the top face and to each of the four side faces by the first continuous adhesive layer; and
    a central metal cap completely covering the first opening and being adhered to the upper surface of the top cover through the first opening by a second continuous adhesive layer, the central metal cap being thicker than the continuous metal foil;
    wherein the disk drive enclosure is helium-filled;
    wherein the second continuous adhesive layer comprises acrylic pressure sensitive adhesive having a thickness in the range 25 to 150 microns; and
    wherein a periphery of the central metal cap overlaps the peripheral foil seal by at least 5 mm.

5. A hermetically sealed disk drive comprising:
    a disk drive enclosure including
        a disk drive base with a bottom face and four side faces, and
        a top cover, wherein the disk drive enclosure has a top face that includes an upper surface of the top cover and an upper surface of the disk drive base;

a peripheral foil seal including
  a continuous metal foil overlapping each of the four side faces and having a first opening therethrough that overlies the upper surface of the to cover, and
  a first continuous adhesive layer coating the continuous metal foil,
  the peripheral foil seal conforming to the disk drive enclosure and being adhered to the top face and to each of the four side faces by the first continuous adhesive layer; and
a central metal cap completely covering the first opening and being adhered to the upper surface of the top cover through the first opening by a second continuous adhesive layer, the central metal cap being thicker than the continuous metal foil;
wherein the disk drive enclosure is helium-filled; and
wherein two of the four side faces meet at a corner, and wherein the top cover is generally octagonal in shape so that it does not overlie the corner, and wherein the peripheral foil seal extends at least 5 mm closer to the corner than does the top cover, and wherein the peripheral foil seal is adhered to the disk drive base adjacent the corner.

6. The hermetically sealed disk drive of claim 5 wherein the continuous metal foil overlaps each of the four side faces by at least 5 mm.

7. The hermetically sealed disk drive of claim 5 wherein the second continuous adhesive layer comprises thermal set epoxy having a thickness in the range 2 to 100 microns.

8. The hermetically sealed disk drive of claim 7 wherein a periphery of the central metal cap overlaps the peripheral foil seal by at least 2 mm.

9. The hermetically sealed disk drive of claim 7 wherein the continuous metal foil includes a second opening therethrough that overlies the upper surface of the disk drive base adjacent the corner, and wherein the central metal cap is adhered to the upper surface of the disk drive base through the second opening.

10. The hermetically sealed disk drive of claim 9 wherein the upper surface of the top cover has a second raised plateau that protrudes into the second opening.

11. A hermetically sealed disk drive comprising:
a disk drive enclosure including
  a disk drive base with a bottom face and four side faces, and
  a top cover, wherein the disk drive enclosure has a top face that includes an upper surface of the top cover and an upper surface of the disk drive base;
a peripheral foil seal including
  a continuous metal foil overlapping each of the four side faces and having a first opening therethrough that overlies the upper surface of the to cover, and
  a first continuous adhesive layer coating the continuous metal foil,
  the peripheral foil seal conforming to the disk drive enclosure and being adhered to the top face and to each of the four side faces by the first continuous adhesive layer; and
a central metal cap completely covering the first opening and being adhered to the upper surface of the top cover through the first opening by a second continuous adhesive layer, the central metal cap being thicker than the continuous metal foil;
wherein the disk drive enclosure is helium-filled; and
wherein the central metal cap is convex in a free state, so that a periphery of the central metal cap is preloaded against the peripheral foil seal with a center of the central metal cap being adhered to the upper surface of the top cover.

12. The hermetically sealed disk drive of claim 11 wherein the upper surface of the top cover has a first raised plateau that protrudes into the first opening.

* * * * *